(12) United States Patent
Wang

(10) Patent No.: US 6,617,728 B1
(45) Date of Patent: Sep. 9, 2003

(54) MOTOR SYNCHRONOUS EXCITATION BRAKE

(76) Inventor: Chun Hsiang Wang, P.O. Box 82-144, Taipei (TW)

(*) Notice: Subject to any disclaimer, the term of this patent is extended or adjusted under 35 U.S.C. 154(b) by 0 days.

(21) Appl. No.: 10/323,779

(22) Filed: Dec. 20, 2002

(51) Int. Cl.$^7$ ................................................ H02K 7/10
(52) U.S. Cl. ........................................................ 310/77
(58) Field of Search ............................... 310/77, 92, 93

(56) References Cited

U.S. PATENT DOCUMENTS

| | | | | |
|---|---|---|---|---|
| 3,579,066 A | * | 5/1971 | Bearfield et al. | 318/372 |
| 4,381,048 A | * | 4/1983 | Haverkamp et al. | 188/171 |
| 5,407,400 A | * | 4/1995 | Thomas et al. | 477/21 |
| 6,376,948 B1 | * | 4/2002 | Li-Yang | 310/77 |

FOREIGN PATENT DOCUMENTS

FR 2 560 722 * 3/1985 .......... H02K/7/102

* cited by examiner

Primary Examiner—Thomas M. Dougherty
Assistant Examiner—Nguyen Hanh
(74) Attorney, Agent, or Firm—Leong C. Lei

(57) ABSTRACT

A motor synchronous excitation brake that shortens the braking time and promotes braking accuracy, comprised of a brake and a motor, the motor having a casing adapted with an exciting coil and a rotor with a shaft, and two end caps each adapted with a braking shoe being respectively provided on both ends of the casing; and the brake being provided between both ends of the rotor and those two end caps, the brake disk being activated synchronously be an excitation coil to apply braking when the motor stops characterized by having two inclined wedges being respectively extending towards the rotor from the outer circumference of a central hole of both brake disks; the wedge being close to the shaft; a graded edge each protruding from the shaft at both ends of the rotor; and a wedge-shaped slot in relation to the inclined wedge on the graded edge to increase excitation area and shorten braking distance and moment.

1 Claim, 4 Drawing Sheets

MOTOR SYNCHRONOUS EXCITATION BRAKE

BACKGROUND OF THE INVENTION (a) Field of the Invention

The present invention is related to a motor synchronous excitation brake, and more particularly, to one that shortens the braking time and promotes braking accuracy.

(b) Description of the Prior Art

Whereas, a motor of the prior art when the power supplied to it is interrupted, will continue to operate due to inertia. Therefore, a brake is usually adapted to the shaft of the motor to stop the motor when the power is interrupted. However, as a diverter is only used to synchronously apply the braking by the brake when the motor stops, drawbacks including inconsistent braking force, malfunction and longer braking time required, and the risks of motor safety in serious cases.

To overcome those problems, an improvement (Utility Pat. No. 186017 titled "Synchronous Excitation Motor Brake") made by this inventor as illustrated in FIG. 1 of the accompanying drawings, a rotor 15 adapted with a shaft 16 is penetrated through a casing 10 provided with an excitation coil 11 for the motor. An end cap 12 is each provided at both ends of the casing 10 to support the shaft 16 of the rotor 15 using bearings. When the motor is conducted, the shaft 16 starts to rotate as driven by the rotor 15 through the excitation coil 11. A brake 20 is provided between the rotor 15 and the end cap 12. A flange 17 formed with a series of wedge-shaped slots 18 is provided on the outer circumference of the rotor 15 while a braking disk 21 is provided by sliding on the shaft 16 and multiple wedges 22 corresponding to those wedge-shaped slots 18 from the flange 17 are provided on the outer circumference of the braking disk 21. Meanwhile, a braking spring 23 is holding against at where between the braking disk 21 and the rotor 15. Consequently, when the motor is excited, the braking disk 21 for being subject to the activated excitation coil 11 moves to the rotor 15 and rotates together with the shaft 16. On the contrary, once the power supplied to the motor is interrupted, the braking disk 21 for no longer being subject to the excitation coil 11 moves towards both end caps 12 of the casing 11 due to the tension exercised by the braking spring 23 for the braking disk 21 to apply synchronous braking in relation to those braking shoes 13 provided on the end caps 12.

The improvement does provide consistent braking force without those malfunctions as observed in the prior art, and faster braking. However, this inventor attempts a further improvement on upgrading the braking precision and shortening the braking time.

SUMMARY OF THE INVENTION

The primary purpose of the present invention is to provide a motor synchronous excitation brake with improved braking precision and operation safety of the motor.

Another purpose of the present invention is to provide a motor synchronous excitation brake with increased braking speed to shorten the braking time required.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
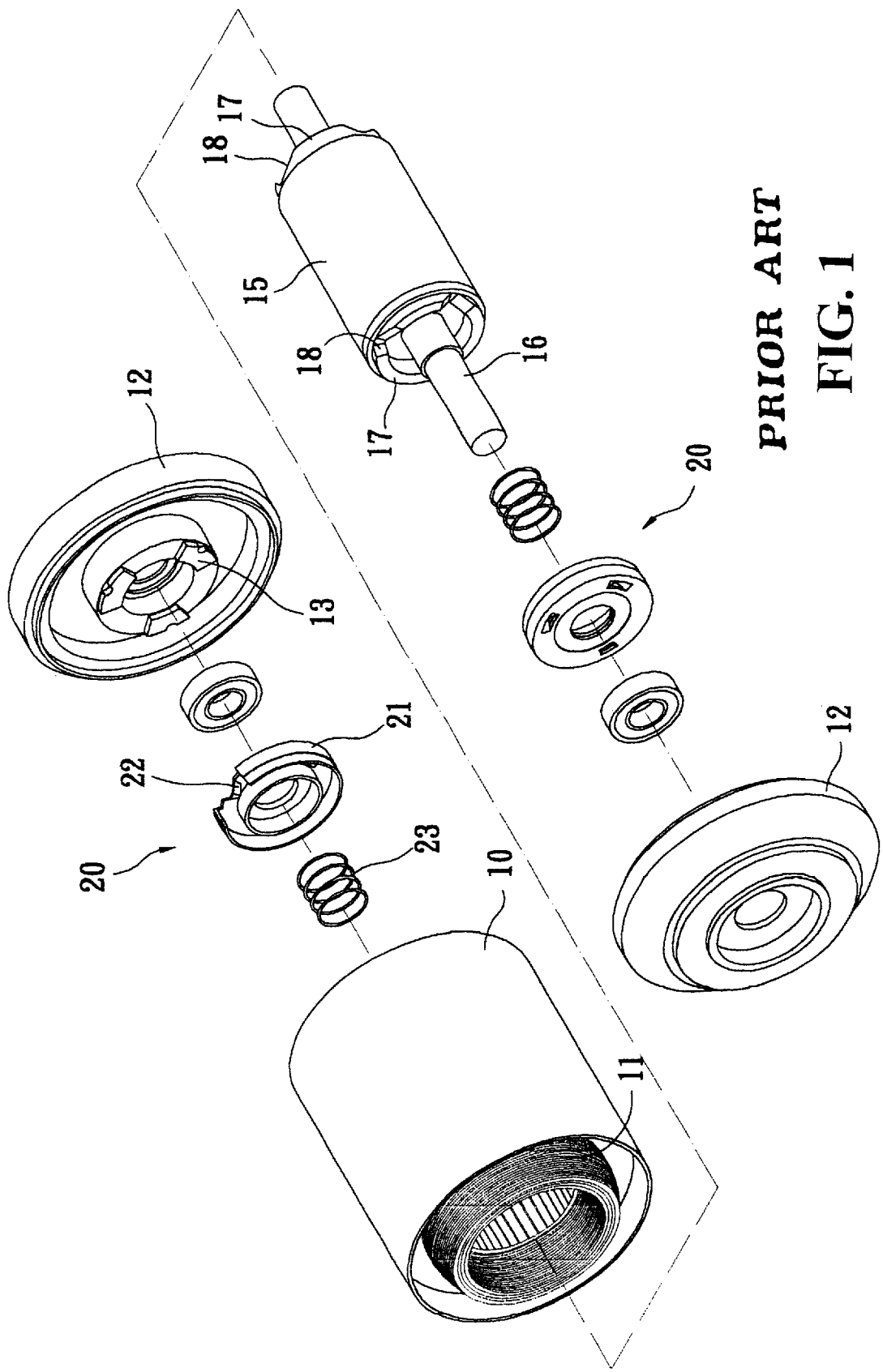
FIG. 1 is an exploded view of a motor braking system of the prior art.
Figure 2:
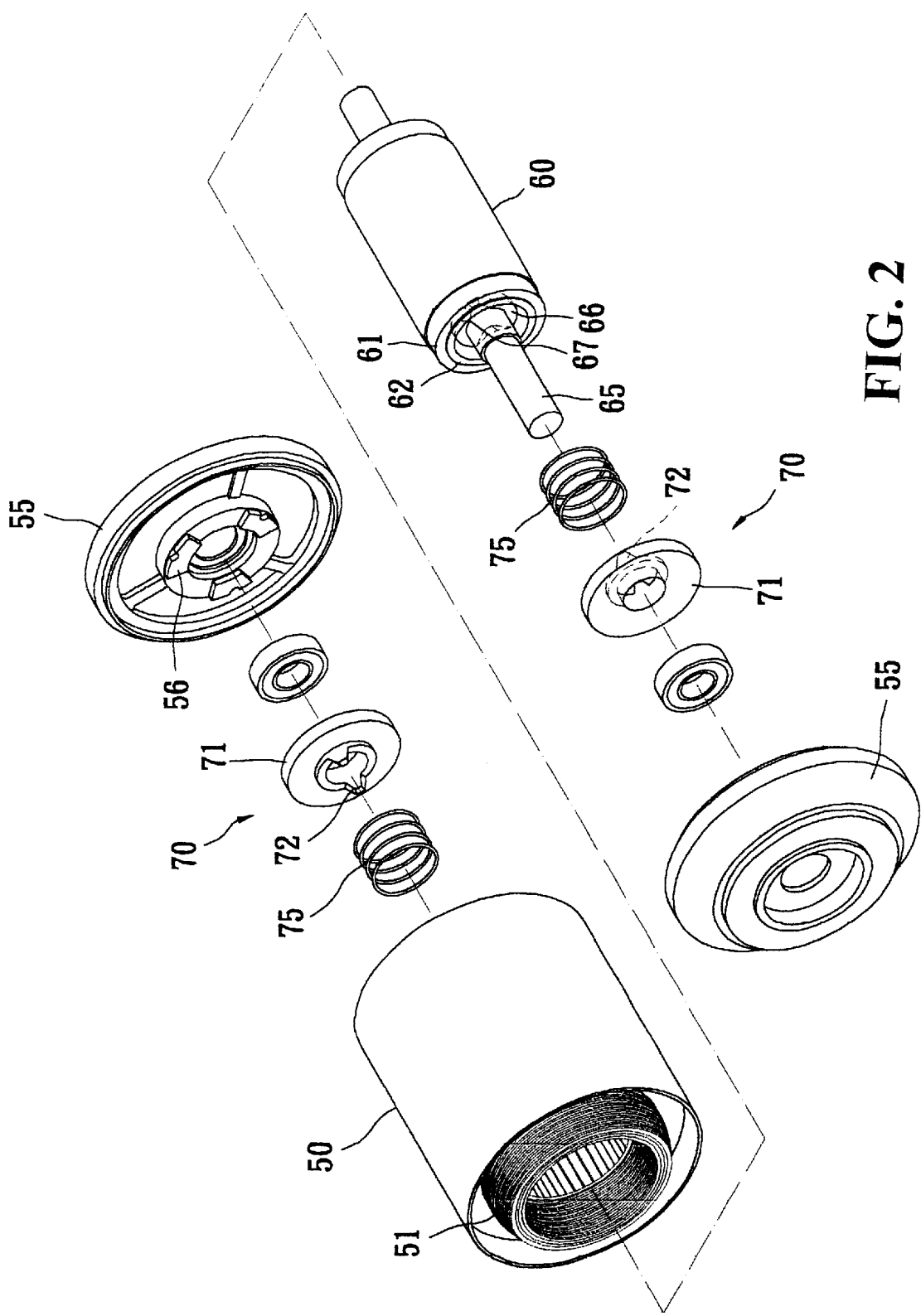
FIG. 2 is an exploded view of a preferred embodiment of the present invention.

Referring to FIG. 2, a preferred embodiment of the present invention is essentially comprised of a motor and a brake. Wherein, the motor includes a casing 50 adapted with an excitation coil 51 and a rotor 60 adapted with a shaft 65. An end cap 55 is each provided to both ends of the casing 50 to support the shaft 65 of the rotor 60. A brake 70 is each provided between both ends of the rotor and both end caps 55, and a braking shoe 56 corresponding to its brake 70 is each provided on the inner side of both of the end caps 55 to subject the brake 70 to the excitation coil 51 in synchronously applying the braking to the braking shoe 56 of the end cap 55.

Also as illustrated in FIG. 2, the brake 70 has at its shaft 65 on both ends each provided by sliding a braking disk 71. Two inclined wedges 72 are respectively extending from the side of the braking disk 71 relatively to the rotor 60. The wedge 72 is disposed at the outer circumference of the braking disk 71 at where closed to its central hole for the wedge 72 to rest on the shaft 65. A graded edge 66 is each protruded from two shafts 65 of the rotor. A wedge-shaped slot 67 in relation to the wedge 72 of the braking disk 71 is formed on the graded edge 66 to allow the wedge 72 of the braking disk 71 to slide in the wedge-shaped slot 67. A protection ring 61 is each formed on the outer circumference of both ends of the rotor and a flushed area 62 is provided to the protection ring 61 at where it is curved to increase the area for attracting the magnetism. A braking spring 75 is held against between the braking disk 71 and the rotor 60 to push the braking disk 71 towards the braking shoe 56 of the end cap 55.

Figure 3A:
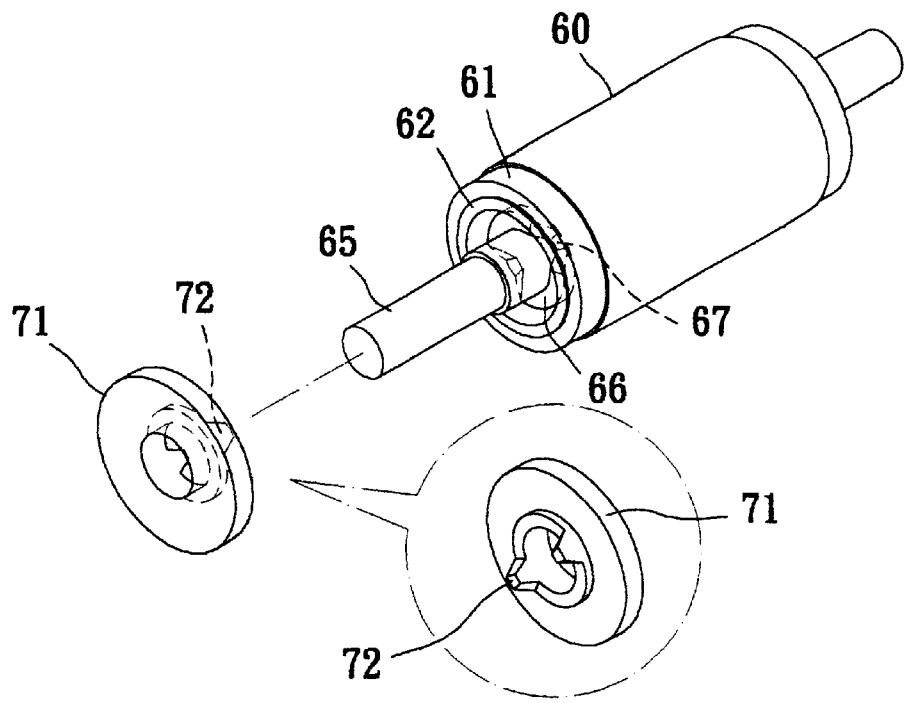
FIG. 3A is a schematic view of the present invention.
Figure 3B:
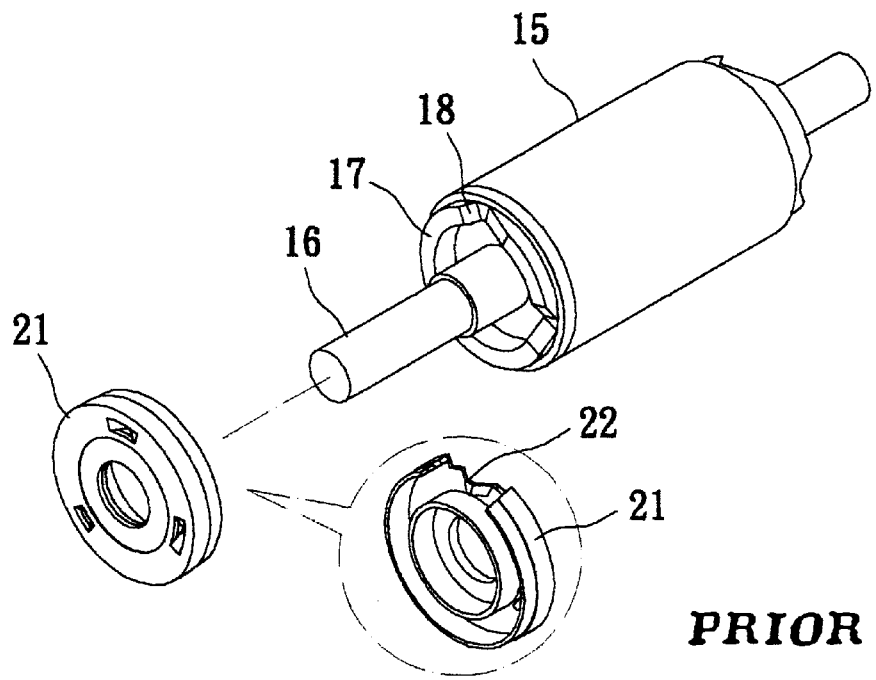
FIG. 3B is a schematic view of the prior art.
Figure 4A:
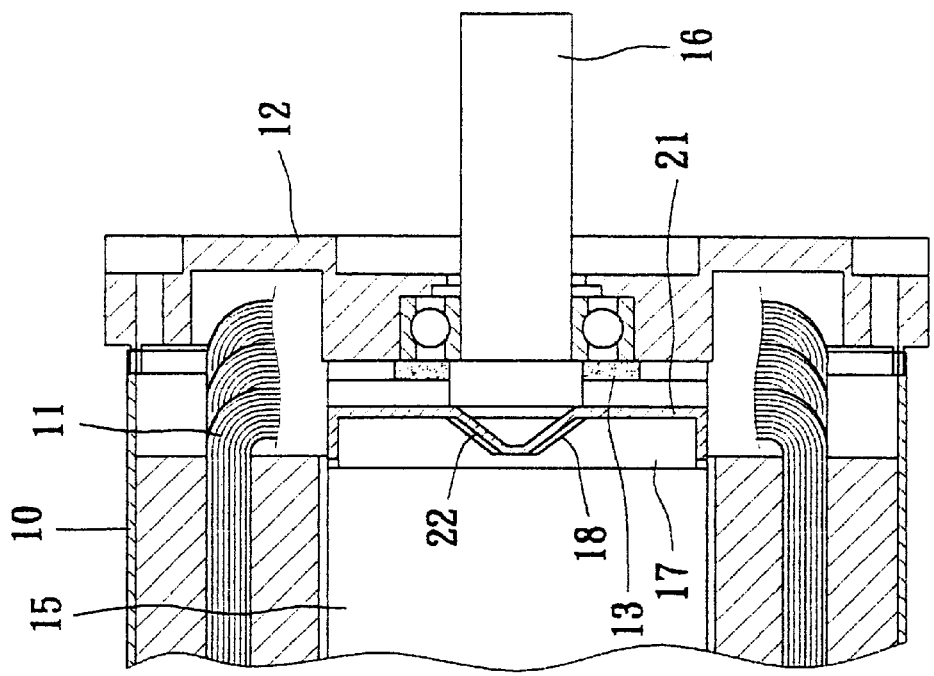
FIG. 4A is a schematic view showing the operation status of the present invention.
Figure 4B:
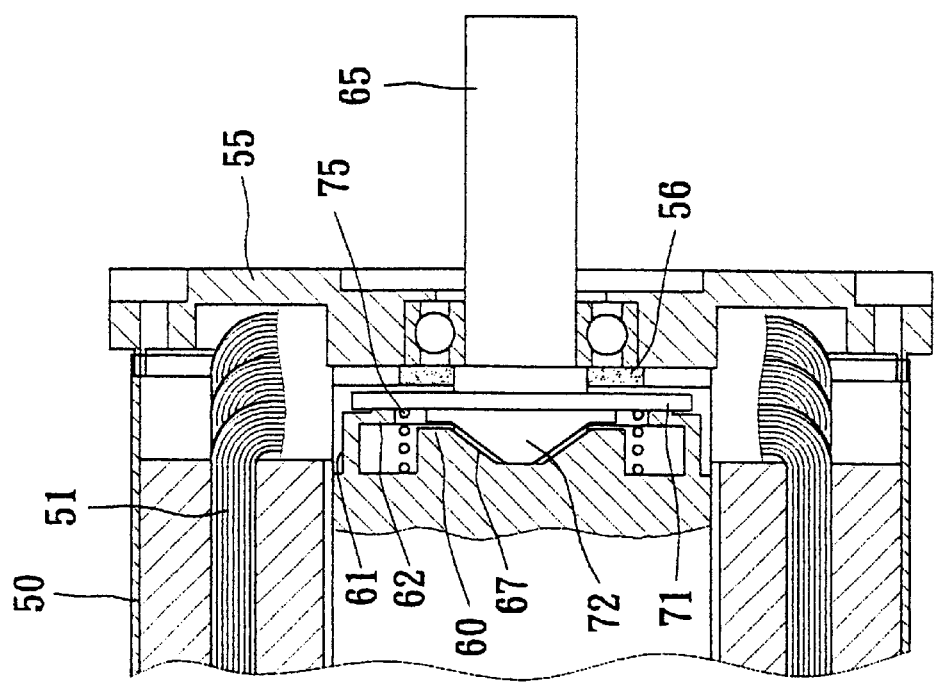
FIG. 4B is a schematic view showing the operation status of the prior art.

Now referring to FIGS. 3A and 4A, once the motor is excited, the rotor 60 for producing inverse magnetic phase starts to rotate. Meanwhile, the braking disk 71 of the brake 70 is magnetized by the rotor 60 to compress the braking spring 75 for the braking disk 71 to rest on the rotor 60. Accordingly, the braking disk 71 clears away from the braking shoe 56 of the end cap 55 for the rotor 60 to maintain free rotation.

On the contrary, once the power supplied to the motor is interrupted, the rotor 60 is deprived of its magnetism and the braking disk 71 for being subject to the braking coil is pushed towards the end cap 55 to rest on the braking shoe 56. Meanwhile, the push and pull force exercised between the inclined wedge-shaped slot 67 and the wedge 72 tightly compresses the braking disk 71 onto the braking shoe 56 to apply the braking by producing powerful braking force in opposite direction since the end cap 55 is a fixed member.

From the comparison illustrated in FIGS. 3A, 3B, 4A and 4B between the present invention and the prior art (ROC Utility Patent No. 186017), it is found that while providing reliable synchronous braking by the brake 70, the present invention further provides the following advantages and practical values:

1. Excellent Braking Precision. The prior art is found with longer arm of action, thus greater torsion moment of inertia rotation because that its wedge-shaped slot 18 and wedge 22 are located on the outer circumference of the rotor; instead, the inclined wedge-shaped slot 67 and the wedge 72 are located at where close to the circumference of the shaft 65. Furthermore, whereas the braking disk 21 of the prior art is located at where subject to the disposition of the wedge 22, the close contact between the braking disk 21 and the braking shoe 13 of the prior art is interrupted due to a gap formed between the braking disk and the end surface of the braking shoe 13. In the present invention, the end surface between the braking disk 71 and the braking shoe 56 is completely flushed to upgrade the braking precision and improve operation safety of the motor.

2. Faster Braking. Given with the smaller torsion moment, complete braking surface without interruption, and the braking disk 71 being able to be placed on the flushed area 62 of the protection ring of the rotor 60, the spacing between the braking disk 71 and the braking shoe 56 of the end cap 55 is shorter to significantly shorten the braking time required when compared to that of the prior art. Field experiments conducted by the Inventor have proved that under the same horsepower and rpm of the motor, it takes approximately three (3) seconds to apply the braking by the prior art and one (1) second, the prior art.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A motor synchronous excitation brake is comprised of a brake and a motor, the motor having a casing adapted with an exciting coil and a rotor with a shaft, and two end caps each adapted with a braking shoe being respectively provided on both ends of the casing; and the brake being provided between both ends of the rotor and those two end caps, characterized by that: two brake disks being respectively provided by sliding on the shaft of both ends of the rotor; two inclined wedges being respectively extending towards the rotor from the outer circumference of a central hole of both brake disks; the wedge being close to the shaft; a graded edge each protruding from the shaft at both ends of the rotor, a wedge-shaped slot in relation to the inclined wedge being formed on the graded edge; a protection ring being adapted to the outer circumference of each end of the rotor; a flushed area being provided to the protection ring at where its end is curved; and a braking spring held against where between the braking disk and the rotor to push the braking disk.

\* \* \* \* \*